United States Patent [19]

Lin

[11] Patent Number: 4,998,815

[45] Date of Patent: Mar. 12, 1991

[54] SUNGLASS FRAME STRUCTURE

[76] Inventor: David J. T. Lin, No. 2, Alley 24, Lane 9, Sec. 1, Nei Hu Road, Taipei, Taiwan

[21] Appl. No.: 413,033

[22] Filed: Sep. 27, 1989

[51] Int. Cl.⁵ .............................................. G02C 1/04
[52] U.S. Cl. ..................................... 351/106; 351/149; 351/121; 2/448; 2/450
[58] Field of Search ................... 351/44, 47, 105, 106, 351/108, 110, 116, 140, 149, 121; 2/450, 443, 448

[56] References Cited

U.S. PATENT DOCUMENTS

| | | | |
|---|---|---|---|
| 2,630,569 | 3/1953 | Baratelli et al. | 2/450 |
| 3,233,249 | 2/1966 | Baratelli et al. | 2/443 |
| 4,670,915 | 6/1987 | Evans | 2/450 |

Primary Examiner—Rodney B. Bovernick
Assistant Examiner—J. P. Ryan
Attorney, Agent, or Firm—Varndell Legal Group

[57] ABSTRACT

A sunglass, which includes a glass with a pair of of spectacle bows connected thereto by means of a pair of fastening elements. The fastening elements each includes a front opening defining therein two retaining recessed for convenient connection with either part of snap ends made at both sides of the glass without the use of any screw elements.

1 Claim, 2 Drawing Sheets

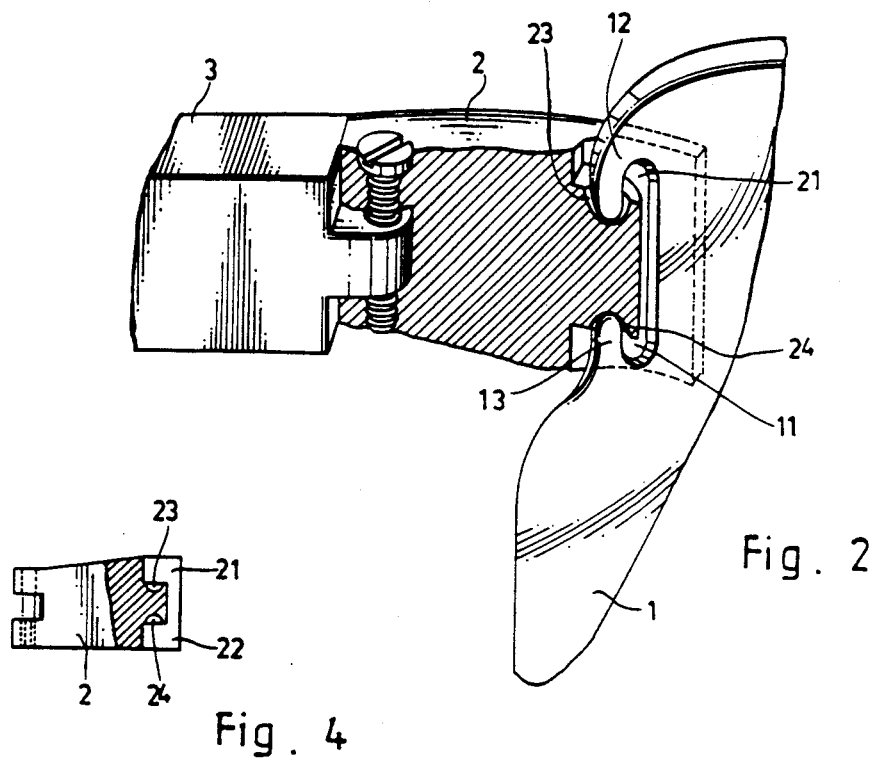
Fig. 2
Fig. 4
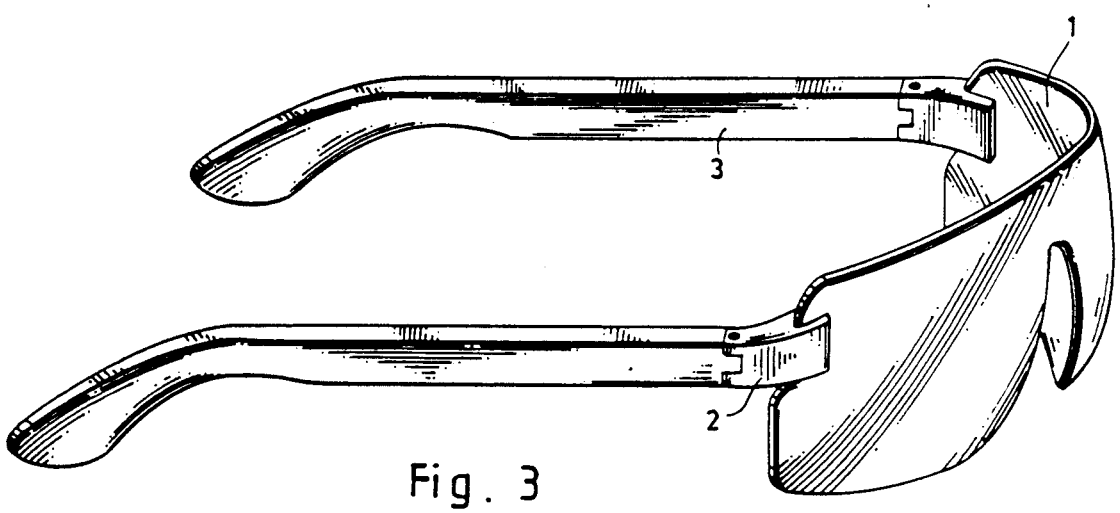
Fig. 3

SUNGLASS FRAME STRUCTURE

BACKGROUND OF THE INVENTION

The present invention if related to a kind of sunglass frame structure and more particularly to the one which includes a piece of glass connected with a pair of spectacle bows by means of a pair of fastening elements.

Sunglass is a device with special lenses, usually tinted, to protect the eyes from the sun's glare. Conventional sunglass is generally comprised of a spectacle frame, a pair of spectacle bows and a pair of lenses. This type of sunglass is expensive and complicated to manufacture and more difficult to assembly. During assembly, lenses must be grinded to match with spectacle frame, and screw elements are commonly required to fix lenses to a spectacle frame. There is also a kind of frameless sunglass which includes a single piece of tinted glass made of plastic material or the like through shape molding process for mounting thereon of a pair of screw sockets for further connection thereto of a pair of spectacle bows. Because the plastic glass is fragile and the screw sockets are generally made of metal material, the plastic glass tends to be damaged during assembly or wearing. Besides, the production process of this kind of conventional frameless sunglass is very complicated and high percentage of defective units can not be eliminated.

It is therefore, the main object of the present invention to provide such a sunglass which is easy to assemble.

Another object of the present invention is to provide such a sunglass which is inexpensive to manufacture.

A yet further object of the present invention is to provide such a sunglass which is durable in use.

The above said objects and the advantages of the present invention will become apparent from the following detailed description of the invention referring to the annexed drawings in which:

BRIEF DESCRIPTION OF THE DRAWINGS

FIG. 2 is a partly sectional assembly view illustrating the connection of a spectacle side to the glass;

FIG. 3 is a perspective assembly view of the present invention; and

FIG. 4 is a partly sectional view of a fastening element according to the present invention.

DETAILED DESCRIPTION OF THE PREFERRED EMBODIMENT

Figure 1:
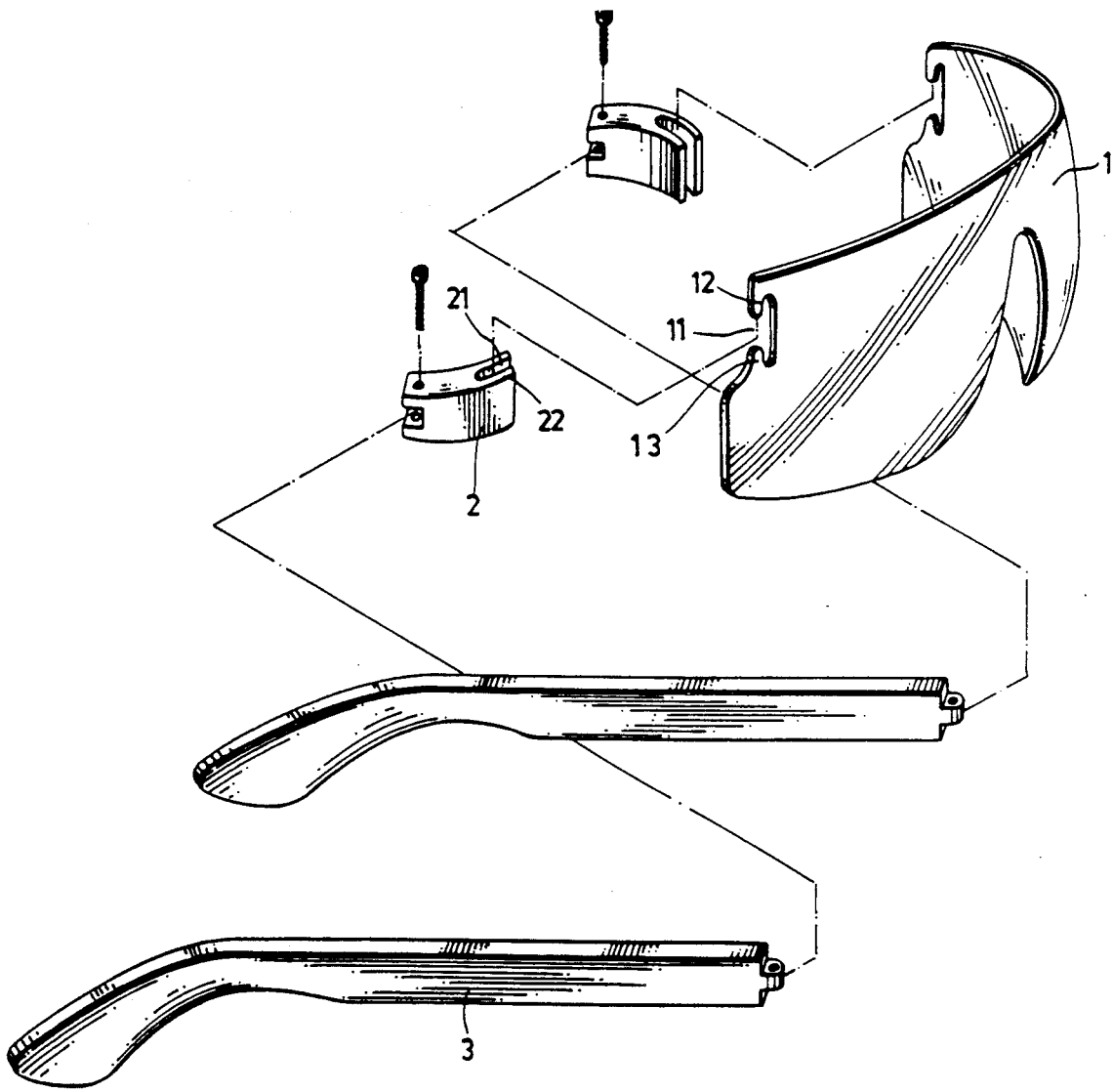
FIG. 1 is a perspective exploded view of a sungleass embodying the present invention.

Turning now to the annexed drawings in detail, therein illustrated is a sunglass embodying the present invention and generally comprised of a single piece of glass (1), a pair of fastening elements (2) and a pair of spectacle bows (3). The glass (1) is made of resilient plastic material through shape molding process, comprising two notches (11) at both sides to respectively define a pair of snap ends (12) and (13) for setting therein of either piece of the pair of fastening elements (2). The two fastening elements (2) are identical and made of resilient plastic material in a curved trapezoid shape comprising a thinner end and a thicker end. The thinner end of each fastening element (2) is fixedly connected with either one of the pair of spectacle bows (3). An opening (21) is made on the thicker end of each fastening element (2) to define externally two opposite side walls (22) and internally an upper and a lower retaining recess (23) and (24) (as shown in FIG. 4). After the pair of spectacle bows (3) are respectively connected to the pair of fastening elements (2) at the thinner end, the fastening elements (2) are obliquely inserted into the notches (11), one after another, letting the top snap end (12) insert into the upper retaining recess (23) and then, the fastening elements (2) are pressed downward vertical to the glass (1) to let the bottom snap end (12) insert into the lower retaining recess (24) (as shown in FIG. 2) to complete the connection. Through the said arrangment, the assembly procedure becomes quite simple and more pratical. A completed assembly of sunglass of the present invention is as illustrated in FIG. 3.

What is claimed is:

1. A sunglass, including
    a piece of glass made of resilient material through shape molding process, comprising two notches at both sides defining therein a pair of snap ends respectively;
    a pair of fastening elements made of resilient material through shape molding process in a curved trapezoid shape comprising a thinner end for connection thereto of either one of a pair of spectacle bows, and a thicker end having an opening made thereon to define externally two opposite side walls and internally an upper and a lower retaining recess; and
    a pair of spectacle bows respectively connected to said fastening elements at the thinner end;
    wherein said pair of fastening elements are respectively set in said two notches of said piece of glass with the upper and lower retaining recesses of each fastening element respectively engaged with the pair of snap ends of each notch of said piece of glass.

* * * * *